(12) United States Patent
Tang et al.

(10) Patent No.: US 9,229,682 B2
(45) Date of Patent: Jan. 5, 2016

(54) PARALLEL DEVICE FOR SOLVING LINEAR EQUATION SET IN FINITE FIELD

(75) Inventors: Shaohua Tang, Guangzhou (CN); Haibo Yi, Guangzhou (CN)

(73) Assignee: South China University of Technology, Guangzhou (CN)

( * ) Notice: Subject to any disclaimer, the term of this patent is extended or adjusted under 35 U.S.C. 154(b) by 81 days.

(21) Appl. No.: 14/127,227

(22) PCT Filed: May 25, 2012

(86) PCT No.: PCT/CN2012/076065
§ 371 (c)(1),
(2), (4) Date: Dec. 18, 2013

(87) PCT Pub. No.: WO2013/071743
PCT Pub. Date: May 23, 2013

(65) Prior Publication Data
US 2014/0297704 A1    Oct. 2, 2014

(30) Foreign Application Priority Data
Nov. 17, 2011   (CN) .......................... 2011 1 0366282

(51) Int. Cl.
*G06F 5/01*    (2006.01)
*G06F 7/72*    (2006.01)

(52) U.S. Cl.
CPC . *G06F 5/01* (2013.01); *G06F 7/724* (2013.01)

(58) Field of Classification Search
None
See application file for complete search history.

(56) References Cited

U.S. PATENT DOCUMENTS

| 6,778,666 | B1* | 8/2004 | Kuzmich | H04L 9/3066 380/28 |
| 6,895,421 | B1* | 5/2005 | Dor | G06F 17/16 708/400 |
| 7,296,047 | B1 | 11/2007 | Walster et al. | |
| 7,519,518 | B2* | 4/2009 | Langemyr | G06F 17/12 703/2 |
| 2007/0291934 | A1* | 12/2007 | Volkovs | H04L 9/0643 380/28 |
| 2011/0246548 | A1* | 10/2011 | Yen | G06F 7/724 708/492 |

FOREIGN PATENT DOCUMENTS

CN    101008937    8/2007

OTHER PUBLICATIONS

International Search Report; International Application No. PCT/CN2012/076065; International Filing Date: May 25, 2012; 2 pages.
English translation; International Search Report; International Application No. PCT/CN2012/076065; 2 pages.
English abstract; Chinese Application No. CN101008937; 1 page.

* cited by examiner

*Primary Examiner* — Michael D Yaary
(74) *Attorney, Agent, or Firm* — Blank Rome LLP

(57) ABSTRACT

The present invention relates to a parallel device for solving linear equations over finite fields, including a processor, an input port, an output port, a pivot finding component, a partial inversion component, a normalization component and an elimination component. The processor is connected to each of the pivot finding component, the partial inversion component, the normalization component, the elimination component, and the input port and the output port. The partial inversion component is connected to the elimination component and the normalization component. The pivot finding component is connected to the elimination component. The present invention enables parallel computing to a certain extent with fast solving speed and simple design, and thus can be widely used in various engineering fields.

8 Claims, 3 Drawing Sheets

PARALLEL DEVICE FOR SOLVING LINEAR EQUATION SET IN FINITE FIELD

FIELD OF THE INVENTION

The present invention relates generally to a device for solving linear equations, and more particularly to a parallel device for solving linear equations over finite fields.

BACKGROUND OF THE INVENTION

Finite fields are fields containing only a finite number of elements, and linear equations over finite fields are equations of which each factor is an element in finite fields. Finding solutions to linear equations over finite fields is widely used in various engineering fields, such as the field of cryptography, and also the field of solving other mathematical problems.

Methods adopted in solving linear equations include Gaussian elimination method and Gauss-Jordan method. By Gaussian elimination method, linear equations are multi-iterated into upper or lower triangular forms, wherein each iteration operation includes three sub-operations: finding pivot, normalization and elimination. If the equations are solvable, then the final solutions are obtained by substitution operation. Gauss-Jordan method, a variant of Gaussian elimination method, is able to solve linear equations by multiple iterations, but it consumes more resources than Gaussian elimination method.

Solving linear equations is a highly computationally complex and time-consuming issue. At present, there is still large room for optimization of solving linear equations, especially for optimization of those over finite fields. So far, devices dedicated to solving linear equations over finite fields have not yet been reported.

SUMMARY OF THE INVENTION

Therefore, in order to address the deficiencies and inadequacies in the art, the present invention aims to provide a parallel device for solving linear equations over finite fields. The object of the invention is achieved by the following technical solutions.

A parallel device for solving linear equations over finite fields, including:

an input port for inputting coefficient matrix B of linear equations over finite fields and irreducible polynomial p(x) selected over the field $GF(2^n)$; the coefficient matrix B is an m×(m+1) matrix; the element a(x) of the coefficient matrix B is an element in the field $GF(2^n)$;

a first processor, including a scheduler and a memory interconnected with each other; the scheduler is configured to control a pivot finding component, a partial inversion component, a normalization component and an elimination component; the memory is configured to store the inputted coefficient matrix B, and to update the stored coefficient matrix B after each iteration operation;

a pivot finding component, including a second processor for finding out the pivot β of the coefficient matrix B;

a partial inversion component, including a third processor for implementing partial inversion calculation;

a normalization component, including a fourth processor and m+1 normalization calculation units; the fourth processor is connected to each of the m+1 normalization calculation units to perform scheduling of the normalization calculation units;

an elimination component, including a fifth processor and m×(m+1) elimination calculation units; the fifth processor is connected to each of the m×(m+1) elimination calculation units to perform scheduling of the elimination calculation units and data transmission;

an output port for outputting the results of linear equations over finite fields being solved, wherein the first processor is connected to the pivot finding component, the partial inversion component, the normalization component, the elimination component, and the input port and the output port; the partial inversion component is connected to the elimination component and the normalization component;

wherein the first processor receives the coefficient matrix B and the irreducible polynomial p(x) which is selected over the field $GF(2^n)$ and outputted from the input port, stores the coefficient matrix B into the memory, sets the counter at m, and sends the column containing the pivot to be found in present iteration process to the pivot finding component; the column containing the pivot to be found in present iteration process is set so that in the $g^{th}$ iteration process, the column containing the pivot to be found is the $g^{th}$ column, $0 \leq g \leq m$;

wherein the pivot finding component implements a process of finding the pivot: determining whether an element with a row number of g and a column number of g is a none-zero element; if yes, this element is determined to be a pivot, and the pivot finding component sends no back feed into the first processor;

if not, then finding none-zero elements one by one among the elements with row numbers of g+1 to m and a column number of g; the first none-zero element found is determined to be the pivot β, and the pivot finding component sends the row number of the pivot as feedback to the processor;

the first processor sends the pivot β found to the partial inversion component, and sends the row where the pivot β is in to the normalization component, and sends the other lines of the input coefficient matrix B to the elimination component;

the partial inversion component implements partial inversion calculation, and outputs the calculated results to the normalization component and the elimination component;

the normalization component and the elimination component implement the normalization calculation and the elimination calculation respectively, and output the calculated results to the first processor;

the first processor updates the coefficient matrix B according to the results of the normalization calculation and the elimination calculation, stores the updated coefficient matrix B into the memory, subtracts 1 from the value of the counter, and sets the present counter as j; a next iteration is implemented until the counter reaches 0;

if the counter is 0, then outputting the last column of the updated coefficient matrix B into the port as the solved results.

The normalization calculation units are logical gate circuits.

The elimination calculation units are logical gate circuits.

The partial inversion calculation specifically includes:

for i=1, ..., n−1, the third processor calculates $\beta^{2^i}$;

let i'=(n−1)÷3, for k=0, 1, ..., i'−1, calculating $S_k = MUL3(\beta^{2^{3k+1}}, \beta^{2^{3k+2}}, \beta^{2^{3k+3}})$; MUL3 is the multiplication of three operands defined over $GF(2^n)$;

outputting $\beta^{2^i}$ and $S_k$ respectively to the normalization component and the elimination component, and h=3i'+1, 3i'+2 ... n−1.

The normalization calculation specifically includes:
the $l^{th}$ normalization calculation unit calculates $$S_{i'} = a_{tl} \times \prod_{k=3i'+1}^{n-1} \beta^{2^k},$$

wherein i'=(n−1)÷3, and $a_{tl}$ is the element in row t and column l of the coefficient matrix B; t is the row where the pivot of the present iteration is in; then calculating $$a_{tl} = \prod_{q=0}^{i'} S_q,$$

wherein l=0, 1, 2, ..., m.

The elimination calculation specifically includes:
the elimination calculation unit numbered (k', l) calculates $$S_{i'+1} = \begin{cases} a_{k't} \times a_{tl} \times \prod_{l=3i'+1}^{n-1} \beta^{2^l}, & j' < 2 \\ \alpha_{tl} \times \prod_{l=3i'+1}^{n-1} \beta^{2^l}, & j' = 2 \end{cases},$$

wherein i'=(n−1)÷3, j'=(n−1)mod 3, and mod represents modular operation;
then calculating $$a_{k'l} = \begin{cases} S_{i'+1} \times \prod_{q=0}^{i'-1} S_q + a_{k'l}, & j' < 2 \\ a_{k't} \times S_{i'+1} \times \prod_{q=0}^{i'-1} S_q + a_{k'l}, & j' = 2 \end{cases},$$

wherein
k'=0, 1, 2, ..., m−1; l=0, 1, 2, ..., m.

The irreducible polynomial p(x) selected over the field $GF(2^n)$ has the following form:

$p(x)=x^n+p_{n-1}x^{n-1}+p_{n-2}x^{n-2}+\ldots+p_1x+1.$

The element a(x) of the coefficient matrix B has the following form:

$a(x)=a_{n-1}x^{n-1}+a_{n-2}x^{n-2}+\ldots+a_0.$

Compared with the prior art, the present invention has the following advantages and technical effects.

By setting independent pivot finding component, partial inversion component, normalization component and elimination component, the present invention realizes parallel computing to a certain extent. The parallel device for solving linear equations over finite fields of the present invention is fast in solving, and simple in design; the partial inversion component, normalization component and elimination component, as well as the solving device for linear equations and other computing devices over finite fields can be widely used in various engineering fields, especially in the hardware implementation of cryptographic algorithms and in solving a variety of mathematical problems.

DETAILED DESCRIPTION OF THE INVENTION

The invention will be better understood with reference to the following description taken in conjunction with the specific embodiments and the accompanying drawings. Accordingly, the scope of the present invention is defined by the appended claims rather than the foregoing description and the exemplary embodiments described therein.

Examples

Figure 1:
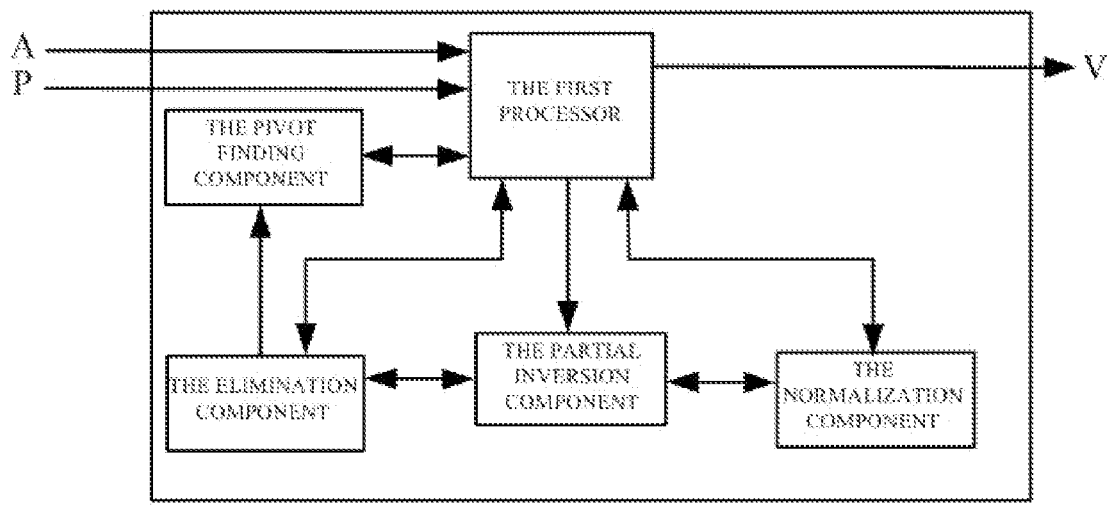
FIG. 1 is a schematic structure chart of the parallel device for solving linear equations over finite fields in one embodiment of the present invention.

As illustrated in FIG. 1, the parallel device for solving linear equations over finite fields of the embodiment includes input ports, a first processor, a pivot finding component, a partial inversion component and an output port; the first processor is connected respectively to the pivot finding component, the partial inversion component, the normalization component, the elimination component, the input port and the output port; the partial inversion component is connected respectively to the elimination component and the normalization component.

The following is a detailed description of the components of the parallel device of the embodiment.

(1) The input ports: as illustrated in FIG. 1, there are two input ports in the parallel device of the embodiment of the invention, wherein input port P is configured to input the irreducible polynomial p(x) selected over the field $GF(2^n)$; input port A is configured to input the coefficient matrix B of the linear equations to be solved.

The coefficient matrix B is a m×(m+1) matrix, and a(x) is an element of the coefficient matrix B; a(x) and p(x) can be in the form of:

$a(x)=a_{n-1}x^{n-1}+a_{n-2}x^{n-2}+\ldots+a_0;$ $p(x)=x^n+p_{n-1}x^{n-1}+p_{n-2}x^{n-2}+\ldots+p_1x+1;$ wherein $a_{n-1}, a_{n-2}, \ldots, a_0$ and $p_{n-1}, p_{n-2}, \ldots, p_1$ are elements in GF(2).

(2) The first processor: as the only component that can communicate with I/O port, the first processor is a core component of the device of the present invention, which can control the pivot finding component, the partial inversion component, the normalization component and the elimination component.

Figure 2:
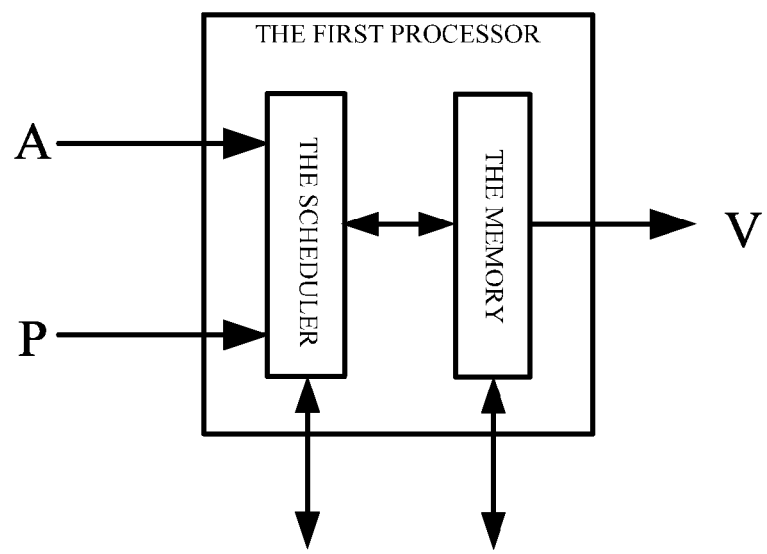
FIG. 2 is a schematic structure chart of the processor in one embodiment of the present invention.

As illustrated in FIG. 2, the first processor includes a scheduler and a memory interconnected with each other; the scheduler is configured to control the pivot finding component, the partial inversion component, the normalization component and the elimination component; the memory is configured to store the inputted coefficient matrix B, and to update the stored coefficient matrix B after each iteration operation.

Figure 3:
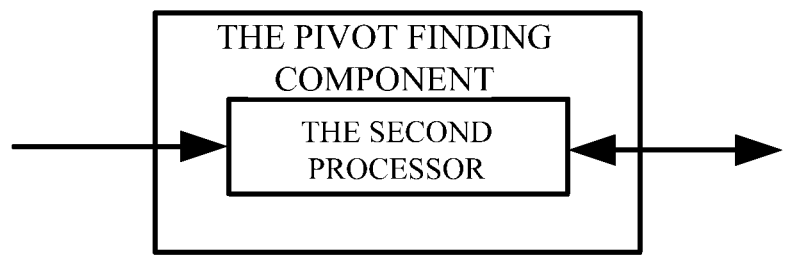
FIG. 3 is a schematic structure chart of the pivot finding component in one embodiment of the present invention.

(3) The pivot finding component, as illustrated in FIG. 3, includes a second processor for finding out the pivot β of the coefficient matrix B.

Figure 4:
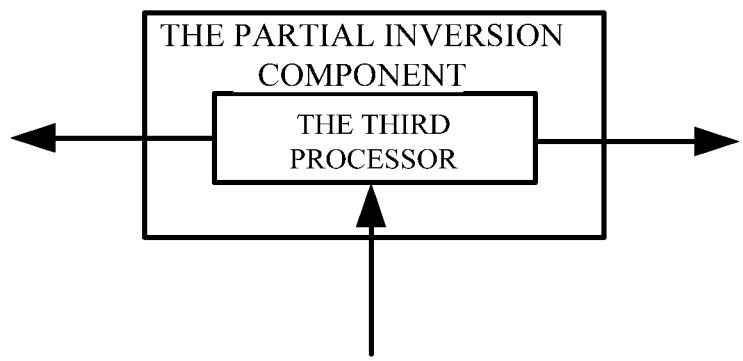
FIG. 4 is a schematic structure chart of the partial inversion component in one embodiment of the present invention.

(4) The partial inversion component, as illustrated in FIG. 4, includes a third processor for implementing partial inversion calculation of the pivot.

Figure 5:
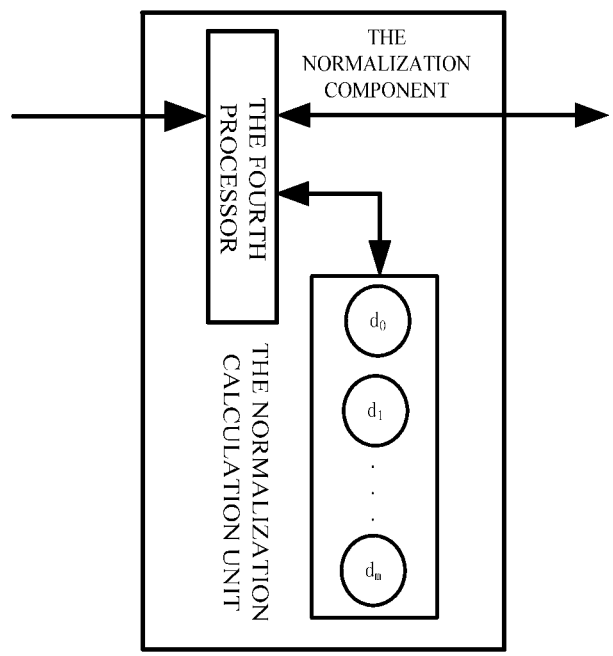
FIG. 5 is a schematic structure chart of the normalization component in one embodiment of the present invention.

(5) The normalization component, as illustrated in FIG. 5, includes a fourth processor and m+1 normalization calculation units $d_0, d_2 \ldots d_m$; the fourth processor is connected respectively to the m+1 normalization calculation units to perform scheduling of the normalization calculation units; the normalization calculation units are logical gate circuits.

Figure 6:
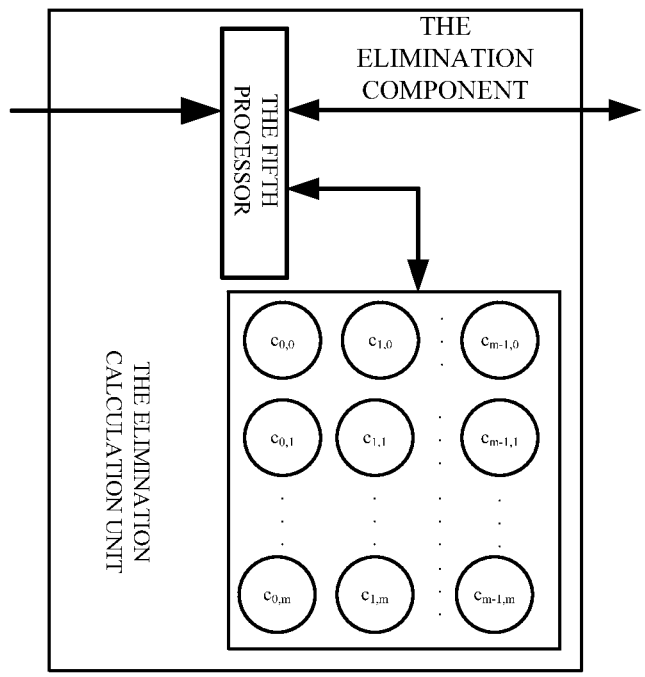
FIG. 6 is a schematic structure chart of the elimination component in one embodiment of the present invention.

(6) The elimination component, as illustrated in FIG. 6, includes a fifth processor and m×(m+1) elimination calculation units $c_{0,0}, c_{0,1} \ldots c_{m-1, m-1}$, the fifth processor is connected respectively to the m×(m+1) elimination calculation units to perform scheduling of elimination calculation units and data transmission; the elimination calculation units are logical gate circuits.

(7) The output port: as illustrated in FIG. 1, the output port V is configured to output the calculated results of linear equations over finite fields being solved.

Working process of the parallel device for solving the linear equations over finite fields of this embodiment is as follows:

the first processor receives the coefficient matrix B and the irreducible polynomial p(x) which is selected over the field GF($2^n$) and outputted from the input port, stores the coefficient matrix B into the memory, sets the counter as m, and sends the column containing the pivot to be found in present iteration process to the pivot finding component; the column containing the pivot to be found in present iteration process is set that: in the $g^{th}$ iteration process, the column containing the pivot to be found is the $g^{th}$ column, 0≤g≤m;

the pivot finding component implements the operation of finding the pivot: determining whether an element with the row number of g and column number of g is a none-zero element; if yes, this element is determined to be the pivot, and the pivot finding component sends no back feed to the first processor;

if not, then finding none-zero elements one by one among the elements with the row numbers of g+1 to m and the column number of g; the first none-zero element found is determined to be the pivot, and the pivot finding component sends the row number of the pivot as feedback to the processor;

the first processor sends the pivot found to the partial inversion component, and sends the row where the pivot is in to the normalization component, and sends the other lines of the input coefficient matrix B to the elimination component;

the partial inversion component implements partial inversion calculation, and outputs the calculated results to the normalization component and the elimination component; the partial inversion calculation specifically includes:

for i=1, ..., n−1, the third processor calculates $\oplus^{2^i}$;

let i'=(n−1)÷3, for k=0, 1, ..., i'−1, calculating $S_k$=MUL3 ($\beta^{2^{3k+1}}, \beta^{2^{3k+2}}, \beta^{2^{3k+3}}$); MUL3 is the multiplication of three operands defined over GF($2^n$);

outputting $\beta^{2^i}$ and $S_k$ respectively to the normalization component and the elimination component by the partial inversion component, h=3i'+1, 3i'+2 ... n−1.

The normalization component and the elimination component respectively implement the normalization calculation and the elimination calculation, and output the results to the first processor;

the normalization calculation specifically includes:
$l^{th}$ normalization calculation unit calculates $$S_{i'} = a_{tl} \times \prod_{k=3i'+1}^{n-1} \beta^{2^k},$$

wherein i'=(n−1)÷3, and $a_{tl}$ is the element in row t and column l of the coefficient matrix; t is the row where the pivot of the present iteration is in; then calculating $$a_{tl} = \prod_{q=0}^{i'} S_q,$$

wherein l=0, 1, 2, ..., m.

The elimination calculation specifically includes:
the elimination calculation unit numbered (k', l) calculates $$S_{i'+1} = \begin{cases} a_{k't} \times a_{tl} \times \prod_{l=3i'+1}^{n-1} \beta^{2^l}, & j' < 2 \\ \alpha_{tl} \times \prod_{l=3i'+1}^{n-1} \beta^{2^l}, & j' = 2 \end{cases},$$

wherein i'=(n−1)÷3, j'=(n−1)mod 3; and then calculates $$a_{k'l} = \begin{cases} S_{i'+1} \times \prod_{q=0}^{i'-1} S_q + a_{k'l}, & j' < 2 \\ a_{k't} \times S_{i'+1} \times \prod_{q=0}^{i'-1} S_q + a_{k'l}, & j' = 2 \end{cases},$$

wherein k'=0, 1, 2, ..., m−1; l=0, 1, 2, ..., m.

The first processor updates the coefficient matrix B according to the calculated results of the normalization calculation and the elimination calculation, stores the updated coefficient matrix B into the memory, subtracts 1 from the value of the counter, and sets the present counter as j; then a next iteration is implemented until the counter reaches 0;

if the counter is 0, then outputting the last column of the updated coefficient matrix B into the port as the solved results.

Working procedure of the parallel device of the present invention is now further described taking the example of n=8 and m=12 (i.e. solving a 12×13 coefficient matrix over finite field GF($2^8$)).

(1) The first processor receives a 12×13 coefficient matrix B and the irreducible polynomial p(x) which is selected over the field GF($2^n$) and outputted from the input port.

Elements a(x) and p(x) of the coefficient matrix B have the following forms, respectively:

$$a(x) = a_7 x^7 + a_6 x^6 + \ldots + a_0;$$

$$p(x) = x^8 + p_7 x^7 + p_6 x^6 + \ldots + p_1 x + 1;$$

wherein $a_7, a_6, \ldots, a_0$ and $p_7, p_6, \ldots, p_1$ are elements in the field GF($2^n$).

(2) The first processor stores the coefficient matrix B into the memory, determines the size of the coefficient matrix B to be 12×13, and sets the counter of the built-in calculator as 12; the processor sends the column (the $1^{st}$ column) containing the pivot to be found in the first iteration process to the pivot finding component, and waits for feedback of the pivot finding component.

(3) The pivot finding component firstly determines whether the element in first row and first column is a non-zero element. If yes, then this element is determined as the pivot, and the pivot finding component does not send any feedback to the first processor. If not, then finding none-zero elements one by one among the elements with row numbers of 2 to 12, and column number of 1; the finding process stops until a first non-zero element is found. The first none-zero element found is determined as the pivot, and the pivot finding component sends the row number of the pivot as feedback to the processor.

(4) The first processor sends the pivot found in step (3) to the partial inversion component, and sends the row where the pivot is in to the normalization component, and sends the other lines of the input coefficient matrix B to the elimination component.

(5) The partial inversion component implements partial inversion calculation:

The pivot $\beta$ is an element in the field $GF(2^8)$; $p(x)$ is an irreducible polynomial inputted to a selected field $GF(2^n)$; for i=1, ..., 7, calculating $\beta^{2^i}$;

and for k=0, 1, calculating $S_k = MUL3(\beta^{2^{3k+1}}, \beta^{2^{3k+2}}, \beta^{2^{3k+3}})$; MUL3 is the multiplication of three operands defined over $GF(2^n)$;

finally, for k=0,1, outputting $\beta^{2^7}$ and $S_k$ to the normalization component and the elimination component.

(6) The normalization component receives the row where the pivot is in and data from the partial inversion component, and sends them to each normalization calculation unit.

The $l^{th}$ normalization calculation unit calculates $$S_{i'} = a_{tl} \times \prod_{k=3i'+1}^{n-1} \beta^{2^k},$$

wherein i'=(n−1)+3, and $a_{tl}$ is the element in row t and column l of the coefficient matrix B; t=1 is the row number of the pivot of the present iteration; then calculating $$a_{tl} = \prod_{q=0}^{i'} S_q,$$

wherein l=0, 1, ..., 12;

the normalization results are outputted to the first processor.

(7) The elimination component receives data from the processor and data from the partial inversion component, and sends them to each elimination calculation unit.

The elimination calculation unit numbered (k', l) calculates $S_{t'+1} = a_{k't} \times a_{tl} \times \beta^{2^7}$, wherein t=1;

and calculates $$a_{k'l} = S_3 \times \prod_{q=0}^{1} S_q + a_{k'l},$$

wherein l=0, 1, ..., 12, k'=0, 1, 2, ..., 11;

the normalization results are outputted to the first processor, and the column number of the pivot of the next iteration (the $2^{nd}$ column) is outputted to the pivot finding component;

the pivot finding component receives elements in the column of the pivot of the next iteration, implements the operation of finding the pivot, and notifies the first processor to receive data from the normalization component and the elimination component.

Upon receiving feedback from the pivot finding component, the processor subtracts 1 from the counter, receives data from the elimination component and the normalization component, stores the data into the memory, and performs a next iteration. After performing 12 times iteration operation in total and the counter returning to 0, the whole solving process is done. The solved results (last column of the coefficient matrix) are then outputted to the output port.

The above embodiments are preferred embodiments of the present invention, which, however, is not intended to limit the implementation of the present invention. All of the variations, modifications, alternatives, combinations, simplifications that are not apart from the spirit of the invention shall be deemed as equivalences to those skilled in the art, and are within the protection scope of the present invention.

What is claimed is:

1. A parallel device for solving linear equations over finite fields, comprising:

an input port, configured to input a coefficient matrix B of linear equations over finite fields, and an irreducible polynomial p(x) selected over a field $GF(2^n)$, wherein the coefficient matrix B is an m×(m+1) matrix, and wherein an element a(x) of the coefficient matrix B is an element in the field $GF(2^n)$;

a first processor, comprising a scheduler and a memory interconnected with each other, wherein the scheduler is configured to control a pivot finding component, a partial inversion component, a normalization component and an elimination component, and wherein the memory is configured to store the coefficient matrix B that is inputted and to update the stored coefficient matrix B after each iteration operation;

a pivot finding component, comprising a second processor configured to find a pivot $\beta$ of the coefficient matrix B;

a partial inversion component, comprising a third processor configured to implement partial inversion calculation;

a normalization component, comprising a fourth processor and m+1 normalization calculation units, wherein the fourth processor is connected to each of the m+1 normalization calculation units to perform scheduling of the m+1 normalization calculation units;

an elimination component, comprising a fifth processor and m×(m+1) elimination calculation units, wherein the fifth processor is connected to each of the m×(m+1) elimination calculation units to perform scheduling of the m×(m+1) elimination calculation units and data transmission; and an output port, configured to output solved results of the linear equations over the finite fields, wherein the first processor is connected to the pivot finding component, the partial inversion component, the normalization component, the elimination component, and the input port and the output port, with the partial inversion component being connected to the elimination component and the normalization component, wherein the first processor receives the coefficient matrix B and the irreducible polynomial p(x) selected over the field $GF(2^n)$ outputted from the input port, stores the coefficient matrix B into the memory, sets a counter at m, and sends a column containing the pivot to be found in a present iteration process to the pivot finding component, the column containing the pivot to be found in the present iteration process is set so that in a $g^{th}$ iteration process, the column containing the pivot to be found is the $g^{th}$ column, wherein $0 \leq g \leq m$, the pivot finding component implements a process of finding the pivot, comprising the steps of:

determining whether an element with a row number of g and a column number of g is a none-zero element;

if yes, the element is determined to be a pivot, and the pivot finding component sends no back feed into the first processor;

if not, then finding none-zero elements one by one among elements with row numbers of g+1 to m and a column number of g; a first none-zero element found is determined to be the pivot β, and the pivot finding component sends the row number of the pivot as feedback to the first processor;

the first processor sends the pivot β found to the partial inversion component, and sends the row where the pivot β is in to the normalization component, and sends the other lines of the input coefficient matrix B to the elimination component;

the partial inversion component implements partial inversion calculation, and outputs the calculated results to the normalization component and the elimination component;

the normalization component and the elimination component implement the normalization calculation and the elimination calculation, and output the calculated results to the first processor;

the first processor updates the coefficient matrix B according to the results of the normalization calculation and the elimination calculation, stores the updated coefficient matrix B into the memory, subtracts 1 from the value of the counter, and sets the present counter as j; a next iteration is implemented until the counter reaches 0;

if the counter is 0, the last column of the updated coefficient matrix B is outputted into the port as the solved results.

2. The parallel device for solving linear equations over finite fields of claim 1, wherein the normalization calculation units are logical gate circuits.

3. The parallel device for solving linear equations over finite fields of claim 1, wherein the elimination calculation units are logical gate circuits.

4. The parallel device for solving linear equations over finite fields of claim 1, wherein the partial inversion calculation specifically comprises:

for $i=1, \ldots, n-1$, the third processor calculates $\beta^{2^i}$;

let $i'=(n-1) \div 3$, for $k=0, 1, \ldots, i'-1$, calculating $S_k = \text{MUL3}(\beta^{2^{3k+1}}, \beta^{2^{3k+2}}, \beta^{2^{3k+3}})$; MUL3 is the multiplication of three operands defined over $GF(2^n)$;

outputting $\beta^{2^i}$ and $S_k$ respectively to the normalization component and the elimination component, and $h=3i'+1, 3i'+2 \ldots n-1$.

5. The parallel device for solving linear equations over finite fields of claim 4, wherein the normalization calculation specifically comprises:

the $l^{th}$ normalization calculation unit calculates $$S_{i'} = a_{tl} \times \prod_{k=3i'+1}^{n-1} \beta^{2^k},$$

wherein $i'=(n-1) \div 3$, and $a_{tl}$ is the element in row t and column l of the coefficient matrix B; t is the row where the pivot of the present iteration is in; then calculating $$a_{tl} = \prod_{q=0}^{i'} S_q,$$

wherein $l=0, 1, 2, \ldots, m$.

6. The parallel device for solving linear equations over finite fields of claim 5, wherein the elimination calculation specifically comprises:

the elimination calculation unit numbered (k', l) calculates $$S_{i'+1} = \begin{cases} a_{k't} \times a_{tl} \times \prod_{l=3i'+1}^{n-1} \beta^{2^l}, & j' < 2 \\ a_{tl} \times \prod_{l=3i'+1}^{n-1} \beta^{2^l}, & j' = 2 \end{cases},$$

wherein $i'=(n-1) \div 3$, $j'=(n-1) \bmod 3$, and mod represents modular operation;

then calculates $$a_{k'l} = \begin{cases} S_{i'+1} \times \prod_{q=0}^{i'-1} S_q + a_{k'l}, & j' < 2 \\ a_{k't} \times S_{i'+1} \times \prod_{q=0}^{i'-1} S_q + a_{k'l}, & j' = 2 \end{cases},$$

wherein $k'=0, 1, 2, \ldots, m-1; l=0, 1, 2, \ldots, m$.

7. The parallel device for solving linear equations over finite fields of any of claim 1, wherein the irreducible polynomial p(x) selected over the field $GF(2^n)$ has the following form:

$$p(x) = x^n + p_{n-1}x^{n-1} + p_{n-2}x^{n-2} + \ldots + p_1 x + 1$$

8. The parallel device for solving linear equations over finite fields of claim 7, wherein the element a(x) of the coefficient matrix B has the following form:

$$a(x) = a_{n-1}x^{n-1} + a_{n-2}x^{n-2} + \ldots + a_0.$$

* * * * *